(12) United States Patent
Kitchin et al.

(10) Patent No.: US 10,891,135 B2
(45) Date of Patent: Jan. 12, 2021

(54) REGISTER RENAMING OF A SHAREABLE INSTRUCTION OPERAND CACHE

(71) Applicant: Samsung Electronics Co., Ltd., Suwon-si (KR)

(72) Inventors: Paul E. Kitchin, Austin, TX (US); Nicholas Humphries, Austin, TX (US); Ken Yu Lim, Cedar Park, TX (US); Ryan Hensley, Austin, TX (US)

(73) Assignee: SAMSUNG ELECTRONICS CO., LTD.

( * ) Notice: Subject to any disclaimer, the term of this patent is extended or adjusted under 35 U.S.C. 154(b) by 30 days.

(21) Appl. No.: 16/294,916

(22) Filed: Mar. 6, 2019

(65) Prior Publication Data

US 2020/0225954 A1    Jul. 16, 2020

Related U.S. Application Data

(60) Provisional application No. 62/791,676, filed on Jan. 11, 2019.

(51) Int. Cl.
*G06F 9/38* (2018.01)
*G06F 9/30* (2018.01)
*G06F 12/0875* (2016.01)

(52) U.S. Cl.
CPC ........... *G06F 9/384* (2013.01); *G06F 9/3001* (2013.01); *G06F 9/30043* (2013.01); *G06F 9/30141* (2013.01); *G06F 12/0875* (2013.01)

(58) Field of Classification Search
None
See application file for complete search history.

(56) References Cited

U.S. PATENT DOCUMENTS

| | | |
|---|---|---|
| 5,790,823 A | 8/1998 | Puzak et al. |
| 7,340,591 B1 | 3/2008 | Pechanek et al. |
| 9,600,288 B1 | 3/2017 | Potter et al. |
| 9,632,785 B2 | 4/2017 | Blomgren et al. |
| 9,652,233 B2 | 5/2017 | Potter et al. |
| 9,817,664 B2 | 11/2017 | Ron et al. |
| 2015/0058571 A1* | 2/2015 | Potter ................. G06F 9/38 711/125 |
| 2017/0242727 A1* | 8/2017 | Crosby ............... G06F 9/4893 |

\* cited by examiner

*Primary Examiner* — John M Lindlof
(74) *Attorney, Agent, or Firm* — Renaissance IP Law Group LLP

(57) ABSTRACT

A system and a method are disclosed to process instructions in an execution unit (EU) that includes an operand cache (OC). The OC stores a copy of at least one frequently used operand stored in a physical register file (PRF). The EU may process instructions using operands obtained from the PRF or from the OC. In the first mode, an OC renaming unit (OC-REN) indicates to the EU to process instructions using operands obtained from the OC if processing the instructions using operands obtained from the OC uses less power than using operands obtained from the PRF. In the second mode, the OC-REN indicates to the EU to process the instructions using operands obtained from the PRF if processing the instructions using operands obtained from the PRF uses less power than using operands obtained from the OC.

15 Claims, 3 Drawing Sheets

REGISTER RENAMING OF A SHAREABLE INSTRUCTION OPERAND CACHE

CROSS-REFERENCE TO RELATED APPLICATION

This patent application claims the priority benefit under 35 U.S.C. § 119(e) of U.S. Provisional Patent Application No. 62/791,676, filed on Jan. 11, 2019, the disclosure of which is incorporated herein by reference in its entirety.

TECHNICAL FIELD

The subject matter disclosed herein generally relates to computing systems. More specifically, the subject matter disclosed herein relates to a system and a method for utilizing an operand cache within an execution unit that executes instructions.

BACKGROUND

The instructions that a central processing unit (CPU) executes may have one or more register source operands. A common mechanism to speed up performance of a CPU is to implement register renaming. For example, each Instruction Set Architecture (ISA) has a fixed number of architectural registers that instructions may utilize. Register renaming avoids a number of serializing dependencies that may arise if instructions are using the same architectural register as one of their source or destination registers. By avoiding the serialization, out-of-order execution of instructions may be allowed.

Register renaming may be accomplished by using a set of physical registers that may be larger than the architectural register set. At any given time, a physical register may represent an actual architectural register or a temporary placeholder for an architectural register. By allowing instructions to use the temporary placeholder registers as source and destination registers, out-of-order execution may be permitted.

An instruction may execute at an execution unit that is designed to perform the type of calculation that the instruction requires. There are several industry-standard mechanisms in which the execution unit may receive the operands required to perform the instruction, such as: reading an operand value from a single, large physical register file; reading an operand from one of many smaller physical register files, or reading an operand value from a common data bus (CDB), which is a set of buses that drive data results from each of the execution units. A common data bus is a mechanism that avoids unnecessary latency and power for reading results from a register file. Not all operand reads, however, can be provided by a CDB because the CDB is based on the timeliness of the operand arrival as compared to the instruction execution.

In certain CPU designs, the data operands may be sent to an execution unit only when the instruction is ready to execute. In other CPU designs that use a "reservation station" style mechanism, the operands may be sent ahead of time and reside in operand buffers of the reservation station until the instruction is ready to execute.

When an instruction reads an operand from a register file, the operation is power-intensive due to the size of register files used in modern high-performance CPU designs. Also, as more execution units are added to CPUs, the total die area required to build a CPUs grows, thereby increasing the distance a register file read must travel, which may lead to higher power and longer latency during instruction execution.

A "Reservation Station" scheme saves operand data in buffers when the operand is ready. If the operand is coming over the CDB, then a register file read has been avoided, regardless of when the instruction is issued to execute. The operand buffers the Reservation Station maintains for each entry can, however, contribute to extra area and power usage. Also, if an operand exists in the register file when the instruction is renamed, then the register file reads occur for the reservation station to receive the operand.

SUMMARY

An example embodiment provides a processing unit that may include a physical register file (PRF), an instruction execution unit (EU), an operand cache (OC) renaming unit (OC-REN) and an OC control unit (OC-CTL). The PRF may store operands. The EU may include an OC that stores a copy of at least one frequently used operand stored in the PRF. The EU may process instructions using operands obtained from the PRF or may process instructions using operands obtained from the OC. The OC-REN may be configured to operate in a first mode or a second mode in which in the first mode the OC-REN may indicate to the EU to process instructions using operands obtained from in the OC, and in the second mode the OC-REN may indicate to the EU to process the instructions using operands obtained from the PRF. The OC-CTL may control the OC-REN to operate in the first mode if processing the instructions using operands obtained from the OC uses less power than using operands obtained from the PRF, and may control the OC-REN to operate in the second mode if processing the instructions using operands obtained from the PRF uses less power than using operands obtained in the OC.

Another example embodiment provides a processing unit that may include a physical register file (PRF), an instruction execution unit (EU), and an operand cached (OC) renaming unit (OC-REN). The PRF may store operands. The EU may include an OC that stores a copy of at least one frequently used operand stored in the PRF. The EU may process instructions using operands obtained from the PRF or may process instructions using operands obtained from the OC. The OC-REN may operate in a first mode or a second mode in which in the first mode the OC-REN may indicate to the EU to process instructions using operands obtained from the OC if processing the instructions using operands obtained from the OC uses less power than using operands obtained from the PRF, and in the second mode the OC-REN may indicate to the EU to process the instructions using operands obtained from the PRF if processing the instructions using operands obtained from the PRF uses less power than using operands obtained from the OC.

Still another example embodiment provides a method to process instructions in a processing unit that may include: storing operands in a physical register file (PRF); storing in an operand cache (OC) of an instruction execution unit (EU) a copy of at least one frequently used operand stored in the PRF, the EU capable of processing instructions using operands obtained from the PRF or using operands obtained from the OC; and indicating to the EU from an OC renaming unit (OC-REN) to operate in a first mode or a second mode, in the first mode the EU to process instructions using operands obtained from in the OC, and in the second mode the EU to process the instructions using operands obtained from the PRF. In one embodiment, indicating to the EU to operate in the first mode or the second mode may include: indicating to the EU to operate in the first mode if processing the instructions using operands obtained from the OC uses less power than using operands obtained from the PRF; and indicating to operate in the second mode if processing the instructions using operands obtained from the PRF uses less power than using operands obtained in the OC.

BRIEF DESCRIPTION OF THE DRAWINGS

In the following section, the aspects of the subject matter disclosed herein will be described with reference to exemplary embodiments illustrated in the figures, in which.

DETAILED DESCRIPTION

Figure 1:
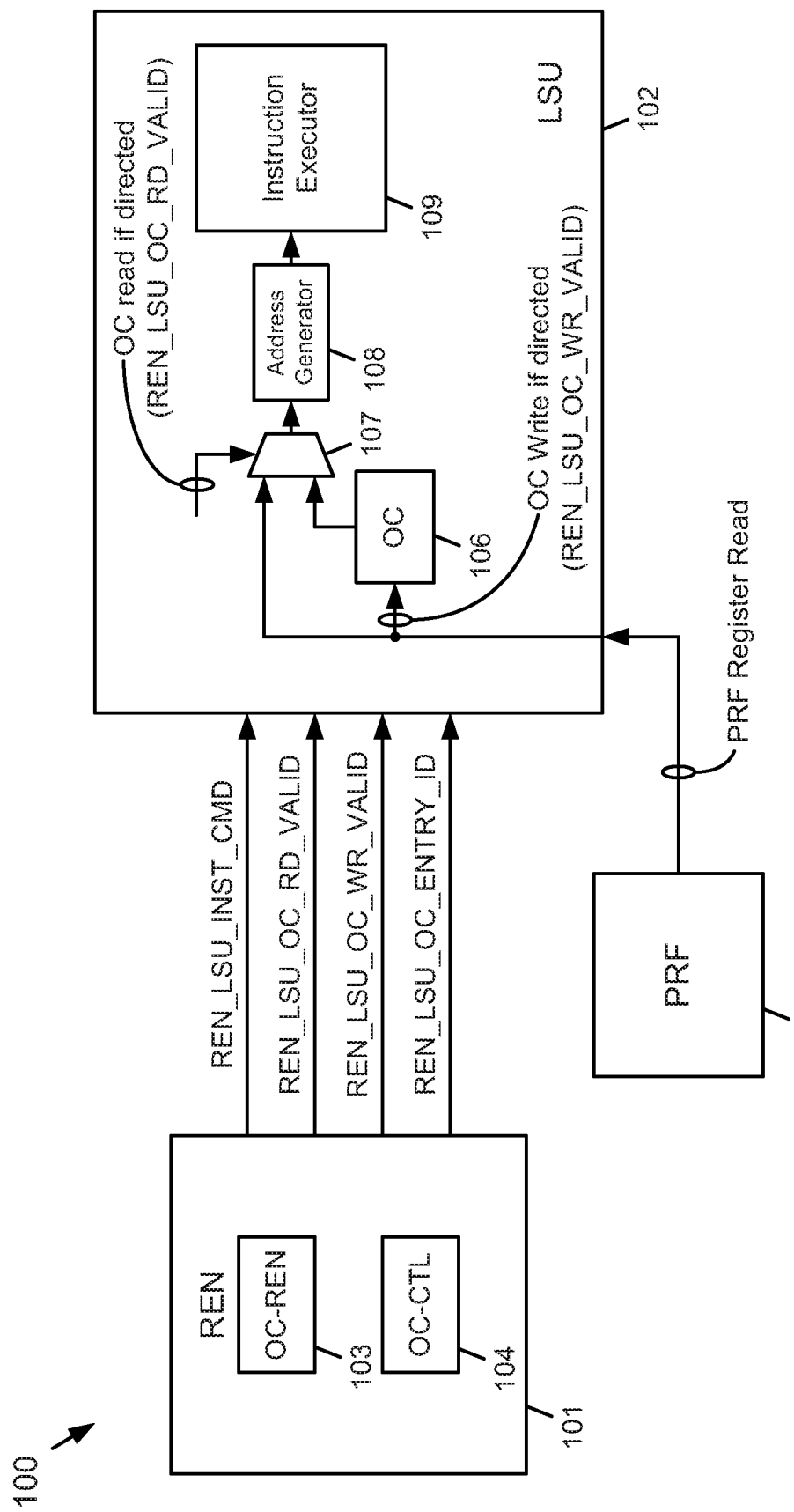
FIG. 1 depicts a portion of a central processing unit that includes a register renaming unit and an execution unit according to the subject matter disclosed herein.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail not to obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not be necessarily all referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. Similarly, various waveforms and timing diagrams are shown for illustrative purpose only. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing particular exemplary embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement the teachings of particular embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The term "module," as used herein, refers to any combination of software, firmware and/or hardware configured to provide the functionality described herein in connection with a module. The software may be embodied as a software package, code and/or instruction set or instructions, and the term "hardware," as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-chip (SoC) and so forth.

The subject matter disclosed herein provides a distributed system of relatively smaller register files instead of one relatively large register file to reduce register file read power and reduce the distance that the data travels between a register file and an execution unit. In one embodiment, an operand cache may be maintained internal to one or more execution units of a CPU in which the operand cache holds copies of one or more frequently used operands. Each cached register value is also still maintained in one or more of the register files that are used to accomplish register renaming. An instruction that issues to an execution unit that contains an operand cache may be directed to read a source operand from one of the traditional operand sources or from one of the operand cache entries in the execution unit. Additionally, one or more instructions may be directed to read the same cached entry.

A register renaming scheme may be extended to maintain operand cache entries and to direct instructions to read a cached entry when appropriate instead of from a traditional operand source, such as the register file or a common data bus network. The register renaming scheme disclosed herein may train on and subsequently predict when classes of instructions are utilizing the same particular architectural and physical register, and thereby select to direct subsequent instructions to utilize the particular operand cache entry. In one embodiment, this may be accomplished by an operand-cache renaming unit directing an instruction of a specific instruction class (e.g., ALU, loads, stores, etc.) to save one of its source operands located in a specific physical register PRF[x] to a specific operand cache entry OC[x]. Subsequent instructions of the same instruction class that are guaranteed to execute in the same execution unit and that will also be sourcing from the specific physical register PRF[x] are directed to read the source operand from OC[x]. Additionally, the logic of the operand-cache renaming unit trains and predicts when an operand cache should be utilized to save power and reduce latency, thereby allowing the system and method disclosed herein to be utilized for workloads only when it is beneficial.

The operand cache may provide power savings by avoiding a register file read in a much more consistent way than typical techniques that rely on reading operands from a register file or from CDB. The rename logic may predict desirable scenarios when many instructions of a particular instruction class are consuming the same operand value repeatedly and reduce expensive register file reads and replace the register file reads with power-efficient operand cache reads.

The subject matter disclosed herein may also provide a latency advantage to reading from an operand cache that is local to an execution unit as opposed to reading from a distant register file. This may translate to a latency advantage for instructions read from the operand cache as long as operand cache was updated sufficiently early before a subsequent instruction is issued to execute.

FIG. 1 depicts a portion of a central processing unit (CPU) 100 that includes a register renaming unit (REN) 101 and an execution unit (EU) 102. The EU 102 may be, but is not limited to a load/store unit (LSU) or an arithmetic logic unit (ALU). The REN 101 may include an operand-cache renaming unit (OC-REN) 103 and an OC controller (OC-CTL) 104. In one embodiment, the OC-REN 103 and the OC-CTL 104 may be combined into one unit.

The REN 101 may manage renaming of registers for instructions using a physical register file (PRF) 105. Additionally, the REN 101 manages an operand cache (OC) 106 within the EU 102. The OC 106 may be any size. In one embodiment, the OC 106 may include four entries. In another embodiment, the OC 106 may include 32 entries.

The OC-REN 103 may be controlled/activated by the OC-CTL 104. If the OC-REN 103 is activated and is processing an instruction having an address register operand, the OC-REN 103 may indicate to the EU 102 that the operand for the instruction should be used to update a specific entry in the OC 106. Additionally, if subsequent instructions processed by the OC-REN 103 use the same address register operand as the operand that was used to update the specific entry in the OC 106, the OC-REN 103 may also indicate to the EU 102 to use the operand in the specific entry in the OC 106 to process the subsequent instructions.

In one embodiment, the EU 102 may receive the following information or signals to utilize the OC 106. A REN_LSU_INST_CMD signal may indicate to the EU 102 what type of operation an instruction is to perform. For example, for an LSU, the commands are loads and stores, whereas for an ALU, the commands are adds and/or subtracts. A REN_LSU_OC_RD_VALID signal may be used in association with a dispatched EU instruction to indicate that the instruction is to read an operand in the OC at an entry indicated by a REN_LSU_OC_ENTRY_ID signal so that the EU may generate the address associated with the instruction. A REN_LSU_OC_WR_VALID signal may be used in association with a dispatched EU instruction to indicate that the instruction is to write an operand in the OC at an entry indicated by a REN_LSU_OC_ENTRY_ID signal. A REN_LSU_OC_ENTRY_ID signal may be used to indicate to the EU 102 the entry location where an operand is to be written to update the OC 106.

In operation, the EU 102 may perform one of three possible actions when processing an instruction depending on the operating state of the OC-REN. As a first possible action, if the OC-REN is not activated (i.e., one mode of two modes of operation), the EU 102 may process an instruction normally by reading, or obtaining, an operand from the PRF 105 or from a CDB (not shown). A multiplexer 107 may be controlled to obtain the operand for the instruction from the PRF 105 or from the CDB, which is used to generate an address for the instruction at the address generator 108. The address for the instruction is used by the instruction executor 109 to execute the instruction.

As a second possible action, if the OC-REN is activated (the other mode of two modes of operation), and the REN_LSU_OC_WR_VALID and the REN_LSU_OC_ENTRY_ID signals have been indicated to the EU 102, the EU updates the OC at a specific entry indicated by the REN_LSU_OC_ENTRY_ID signal with the source register that is used to generate the address for the instruction. In this scenario, the address for the instruction is generated as described in connection with the first possible action.

As a third possible action, if the OC-REN is activated and the REN_LSU_OC_RD_VALID and the REN_LSU_OC_ENTRY_ID signals have been indicated to the EU 102, the EU reads, or obtains, the operand for the instruction at the specific entry in the OC 106 indicated by the REN_LSU_OC_ENTRY_ID signal to generate the address for the instruction. The multiplexer 107 may be controlled to obtain the operand for the instruction from the OC 106, which is used to generate an address for the instruction at the address generator 108. The address for the instruction is executed by instruction executor 109.

In one embodiment, the OC-CTL 104 may determine when it is beneficial to utilize the OC 106 based on the following power values that are determined, or measured, on the CPU design. A first power value is the power $PRF_{RD\_PWR}$ used to read a register from the PRF. A second power value is the power $OC_{WR\_PWR}$ used to write a register to the OC, and a third power value is the power $OC_{RD\_PWR}$ used to read a register from the OC.

During operation, the OC-CTL 104 (or the OC-REN 013) may determine the following statistical numbers that are based on a software program that is being currently executed by the CPU 100. A first statistical number is the number $NUM_{OC\_RD\_INST}$ of instructions of the currently executed software that reads from the OC 106. A second statistical number is the number $NUM_{OC\_WR\_INST}$ of instructions of the currently executed software that write to the OC. Both of these statistical numbers are predictions by nature because they are determined by evaluating the instructions of the software program before the instructions execute.

Using the three power values and the two statistical numbers, the OC-CTL 104 may evaluate the following expression. If it is determined to be true, the OC-REN activates the OC read/write logic:

$$(PRF_{RD\_PWR} * NUM_{OC\_RD\_INST}) > (NUM_{OC\_RD\_INST} * OC_{RD\_PWR}) + (NUM_{OC\_WR\_INST} * OC_{WR\_PWR}) \quad (1)$$

Equation (1) may be further reduced to:

$$(PRF_{RD\ PWR} - OC_{RD\ PWR}) * NUM_{OC\ RD\ INST} > (NUM_{OC\ WR\ INST} * OC_{WR\ PWR}) \quad (2)$$

If the expression is determined to be false, then the OC-REN logic may be disabled, or deactivated, for a predetermined period of time at which time the OC-CTL evaluates the software program to determine whether the OC 106 may be better utilized during a different portion of the execution of the software program. Examples of conditions that may utilize the OC 106 are if a large number of EU instructions, such as 1 million instructions, use the same operand to generate an address for an instruction, or if a context change has occurred during execution of the software program.

Figure 2:
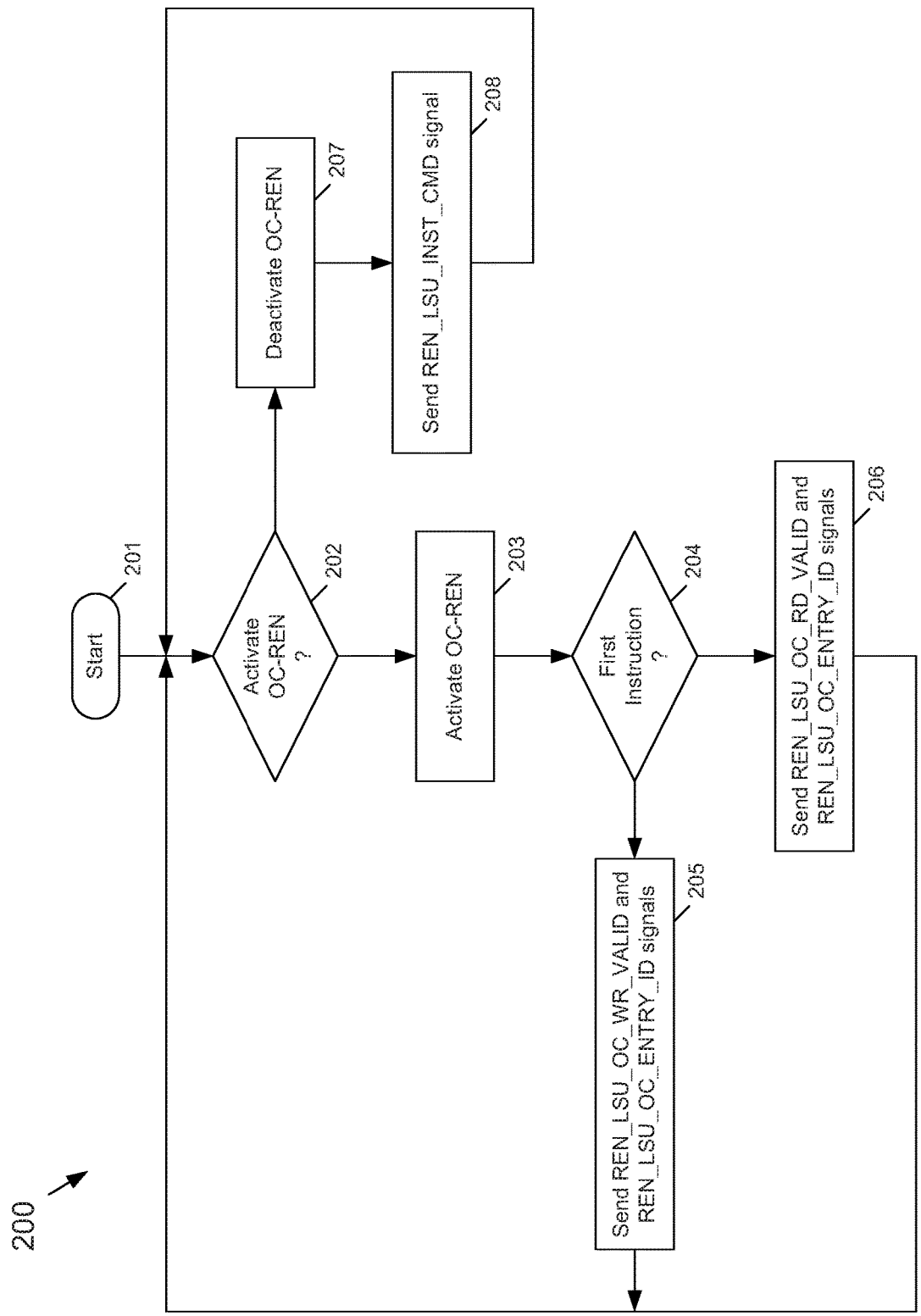
FIG. 2 depicts a flowchart for an example method to process instructions in a processing unit that may utilize an operand cache according to the subject matter disclosed herein.

With reference to FIG. 1, FIG. 2 depicts a flowchart 200 for an example method to process instructions in a processing unit that may utilize an operand cache according to the subject matter disclosed herein. The method begins at 201. At 202, it is determined by the OC-CTL 104 whether to activate the OC-REN 103. In one embodiment, the OC-CTL 104 determines if processing instructions using operands obtained from the OC 106 uses less power than using operands obtained from the PRF 105. If so, flow continues to 203 where the OC-REN 103 is activated.

Flow continues to 204 where it is determined whether the instruction being processed is the first instruction that is to be processed by the EU 102 since the OC-REN 103 was activated. If so, flow continues to 205 where the OC-REN 103 sends a REN_LSU_OC_WR_VALID signal and a REN_LSU_OC_ENTRY_ID signal to the EU 102. The EU updates the OC 106 at a specific entry indicated by the REN_LSU_OC_ENTRY_ID signal with the source register that is used to generate the address for the instruction. In one embodiment, the multiplexer 107 may be controlled to obtain the operand for the instruction from the specific entry of the OC 106. The operand is used to generate an address for the instruction at the address generator 108, and the address for the instruction is used by the instruction executor 109 to execute the instruction. Flow returns to 202.

If, at 204, it is determined that the instruction being processed is not the first instruction that is to be processed by the EU 102 since the OC-REN was activated, flow continues to 206 where the OC-REN 103 sends a REN_LSU_OC_RD_VALID signal and a REN_LSU_OC_ENTRY_ID signal to the EU 102. The multiplexer 107 is controlled to obtain the operand for the instruction from the specific entry of the OC 106. The operand is used to generate an address for the instruction at the address generator 108, and the address for the instruction is used by the instruction executor 109 to execute the instruction. Flow returns to 202.

If, at 202, it is determined by the OC-CTL 104 to not activate the OC-REN 103, flow continues to 207 where the OC-REN is deactivated. Flow continues to 208 where the EU 102 may process an instruction normally by reading, or obtaining, an operand from the PRF 105 or from a CDB (not shown). A multiplexer 107 may be controlled to obtain the operand for the instruction from the PRF 105 or from the CDB, which is used to generate an address for the instruction at the address generator 108. The address for the instruction is used by the instruction executor 109 to execute the instruction. Flow returns to 202.

Figure 3:
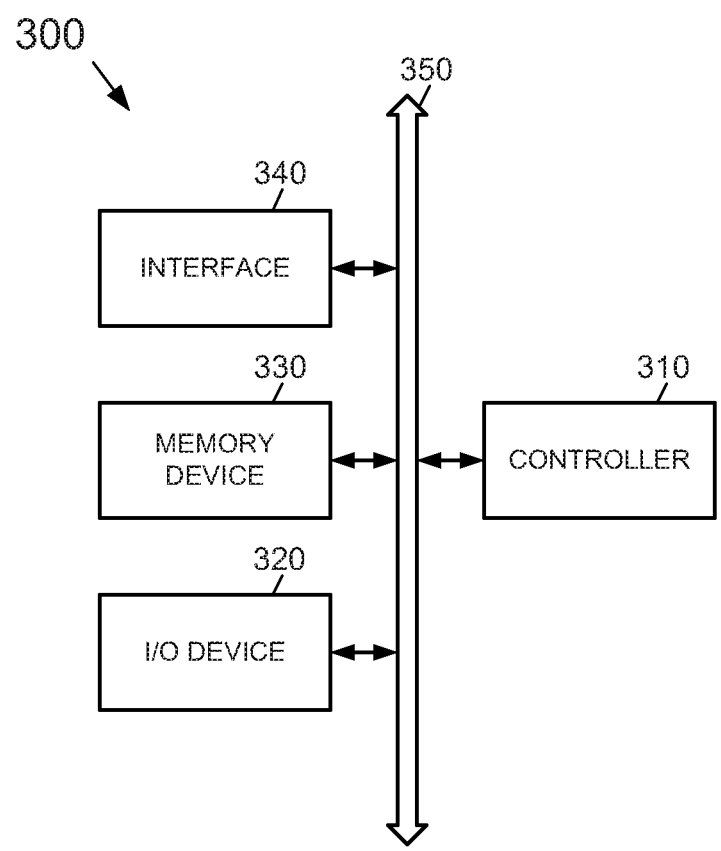
FIG. 3 depicts an electronic device that comprises one or more integrated circuits (chips) comprising one or more processing units that utilize an operand cache according to the subject matter disclosed herein.

FIG. 3 depicts an electronic device 300 that comprises one or more integrated circuits (chips) comprising one or more processing units that utilize an operand cache according to the subject matter disclosed herein. Electronic device 300 may be used in, but not limited to, a computing device, a personal digital assistant (PDA), a laptop computer, a mobile computer, a web tablet, a wireless phone, a cell phone, a smart phone, a digital music player, or a wireline or wireless electronic device. The electronic device 300 may comprise a controller 310, an input/output device 320 such as, but not limited to, a keypad, a keyboard, a display, a touch-screen display, a camera, and/or an image sensor, a memory 330, and an interface 340 that are coupled to each other through a bus 350. The controller 310 may comprise, for example, at least one microprocessor, at least one digital signal process, at least one microcontroller, or the like. The memory 330 may be configured to store a command code to be used by the controller 310 or a user data. Electronic device 300 and the various system components comprising electronic device 300 may comprise one or more processing units that utilize an operand cache according to the subject matter disclosed herein. The interface 340 may be configured to include a wireless interface that is configured to transmit data to or receive data from a wireless communication network using a RF signal. The wireless interface 340 may include, for example, an antenna, a wireless transceiver and so on. The electronic system 300 also may be used in a communication interface protocol of a communication system, such as, but not limited to, Code Division Multiple Access (CDMA), Global System for Mobile Communications (GSM), North American Digital Communications (NADC), Extended Time Division Multiple Access (E-TDMA), Wideband CDMA (WCDMA), CDMA2000, Wi-Fi, Municipal Wi-Fi (Muni Wi-Fi), Bluetooth, Digital Enhanced Cordless Telecommunications (DECT), Wireless Universal Serial Bus (Wireless USB), Fast low-latency access with seamless handoff Orthogonal Frequency Division Multiplexing (Flash-OFDM), IEEE 802.20, General Packet Radio Service (GPRS), iBurst, Wireless Broadband (WiBro), WiMAX, WiMAX-Advanced, Universal Mobile Telecommunication Service—Time Division Duplex (UMTS-TDD), High Speed Packet Access (HSPA), Evolution Data Optimized (EVDO), Long Term Evolution—Advanced (LTE-Advanced), Multichannel Multipoint Distribution Service (MMDS), and so forth.

As will be recognized by those skilled in the art, the innovative concepts described herein can be modified and varied over a wide range of applications. Accordingly, the scope of claimed subject matter should not be limited to any of the specific exemplary teachings discussed above, but is instead defined by the following claims.

What is claimed is:

1. A processing unit, comprising:
   a physical register file (PRF) that stores operands;
   an instruction execution unit (EU) including an operand cache (OC) that stores a copy of at least one frequently used operand stored in the PRF, the EU to process instructions of a software program using operands obtained from the PRF, or to process instructions using operands obtained from the OC;
   an OC renaming unit (OC REN) that operates in a first mode or a second mode, in the first mode the OC REN indicates to the EU to process instructions using operands obtained from in the OC, and in the second mode the OC REN indicates to the EU to process instructions using operands obtained from the PRF; and
   an OC control unit (OC CTL) that determines an estimated power usage and controls the OC REN to operate, based on an evaluation by the OC CTL of a difference between an amount of power used to read a register in the PRF and an amount of power used to read a register in the OC in which the difference is multiplied by a number of currently executed instructions that read from the OC compared to an amount of power used to write a register in the OC multiplied by a number of currently executed instructions that write to the OC, in the first mode as a result of the estimated power usage indicating that processing instructions using operands obtained from the OC uses less power than using operands obtained from the PRF, and in the second mode as a result of the estimated power usage indicating that processing the instructions using operands obtained from the PRF uses less power than using operands obtained in the OC.

2. The processing unit of claim 1, wherein in the first mode, the OC REN further directs the EU to store an operand of a first instruction in the OC.

3. The processing unit of claim 2, wherein in the first mode, the OC REN further directs the EU to obtain the operand of the first instruction for use with processing a second instruction that is subsequent to the first instruction.

4. The processing unit of claim 1, wherein the OC CTL controls the OC REN to operate in the second mode for a predetermined period of time based on processing instructions using operands obtained from the PRF uses less power than using operands obtained in the OC.

5. The processing unit of claim 1, wherein the instruction execution unit comprises a load/store unit or an arithmetic processing unit.

6. The processing unit of claim 1, wherein the OC REN and the OC CTL are part of a renaming unit of the processing unit.

7. A processing unit, comprising:
a physical register file (PRF) that stores operands;
an instruction execution unit (EU) including an operand cache (OC) that stores a copy of at least one frequently used operand stored in the PRF, the EU processing instructions of a software program using operands obtained from the PRF or processing the instructions using operands obtained from the OC; and
a renaming unit (REN), the REN operating in a first mode or a second mode, in the first mode the REN indicating to the EU to process instructions using operands obtained from the OC as a result of an evaluation by the REN of a difference between an amount of power used to read a register in the PRF and an amount of power used to read a register in the OC in which the different is multiplied by a number of currently executed instructions that read from the OC compared to an amount of power used to write a register in the OC multiplied by a number of currently executed instructions that write to the OC that the instructions using operands obtained from the OC use less power than instructions using operands obtained from the PRF, and in the second mode the REN indicating the EU to process instructions using operands obtained from the PRF as a result of the evaluation by the REN that instructions using operands obtained from the PRF use less power than using operands obtained from the OC.

8. The processing unit of claim 7, wherein in the first mode, the REN further directs the EU to store an operand of a first instruction in the OC.

9. The processing unit of claim 8, wherein in the first mode, the REN further directs the EU to obtain the operand of the first instruction for use with processing a second instruction that is subsequent to the first instruction.

10. The processing unit of claim 7, wherein the REN operates in the second mode for a predetermined period of time based on processing instructions using operands obtained from the PRF uses less power than using operands obtained in the OC.

11. The processing unit of claim 7, wherein the instruction execution unit comprises a load/store unit or an arithmetic processing unit.

12. A method to process instructions in a processing unit, the method comprising:
storing operands in a physical register file (PRF);
storing in an operand cache (OC) of an instruction execution unit (EU) a copy of at least one frequently used operand stored in the PRF, the EU processing instructions of a software program using operands obtained from the PRF or processing the instructions using operands obtained from the OC; and
indicating to the EU from an renaming unit (REN) to operate in a first mode or a second mode, in the first mode the EU processing instructions using operands obtained from in the OC as a result of an evaluation by the REN of a difference between an amount of power used to read a register in the PRF and an amount of power used to read a register in the OC in which the different is multiplied by a number of currently executed instructions that read from the OC compared to an amount of power used to write a register in the OC multiplied by a number of currently executed instructions that write to the OC that, and in the second mode the EU to process instructions using operands obtained from the PRF as a result of the evaluation by the REN that the instructions using operands obtained from the PRF use less power than using operands obtained from the OC.

13. The method of claim 12, further comprising directing the EU to store an operand of a first instruction in the OC in the first mode.

14. The method of claim 13, further comprising directing the EU to obtain the operand of the first instruction for use with processing a second instruction that is subsequent to the first instruction in the first mode.

15. The method claim 12, further comprising indicating the EU to operate in the second mode for a predetermined period of time based on processing instructions using operands obtained from the PRF uses less power than using operands obtained in the OC.

* * * * *